Patented Aug. 25, 1942

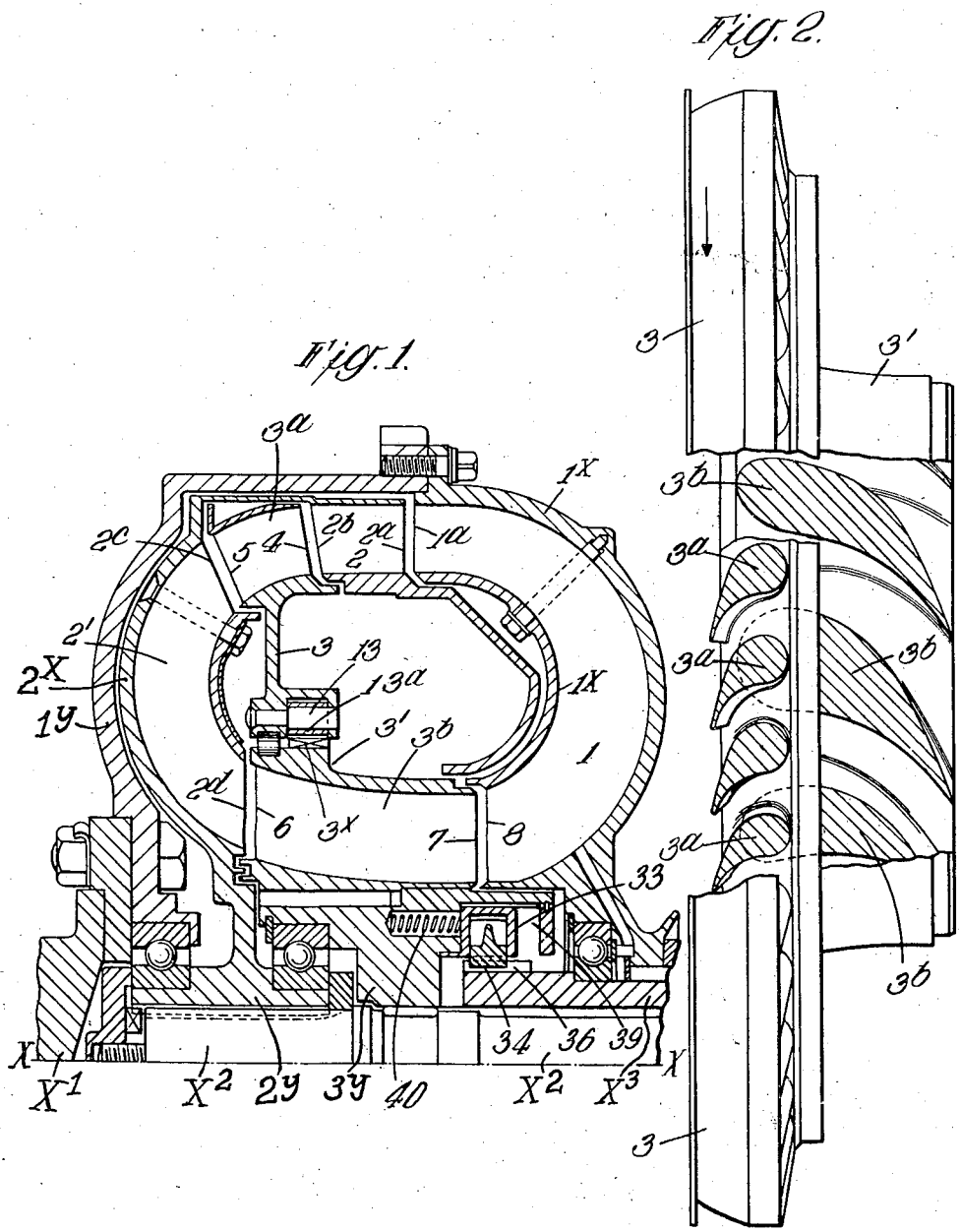

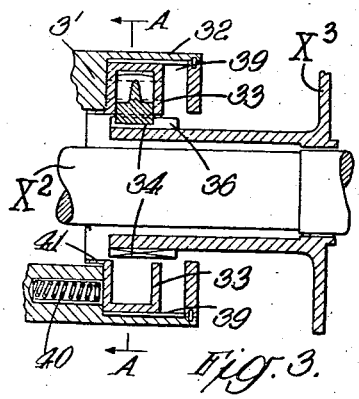
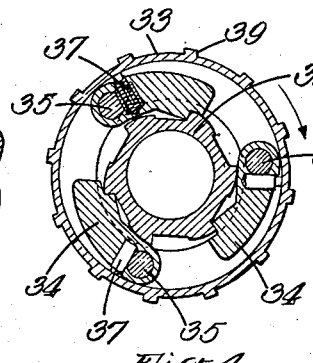
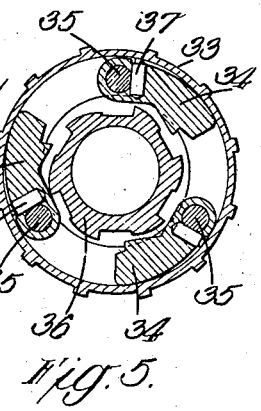
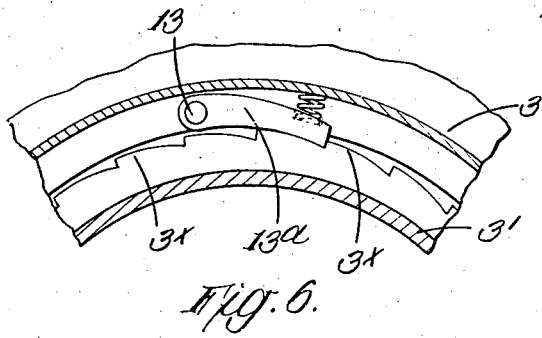
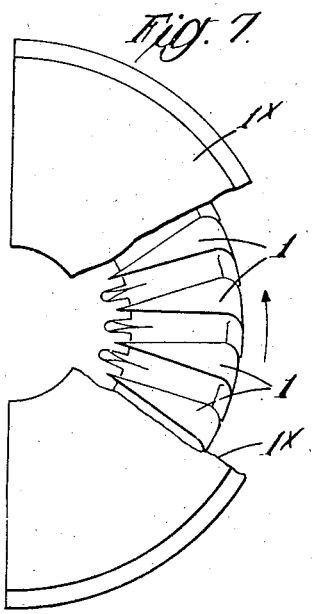
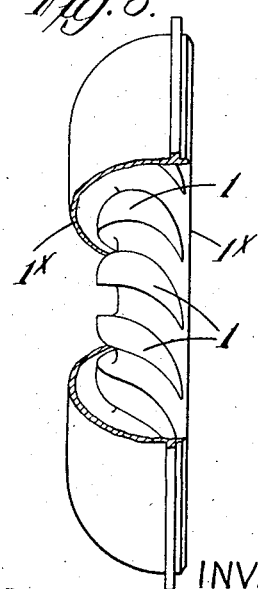

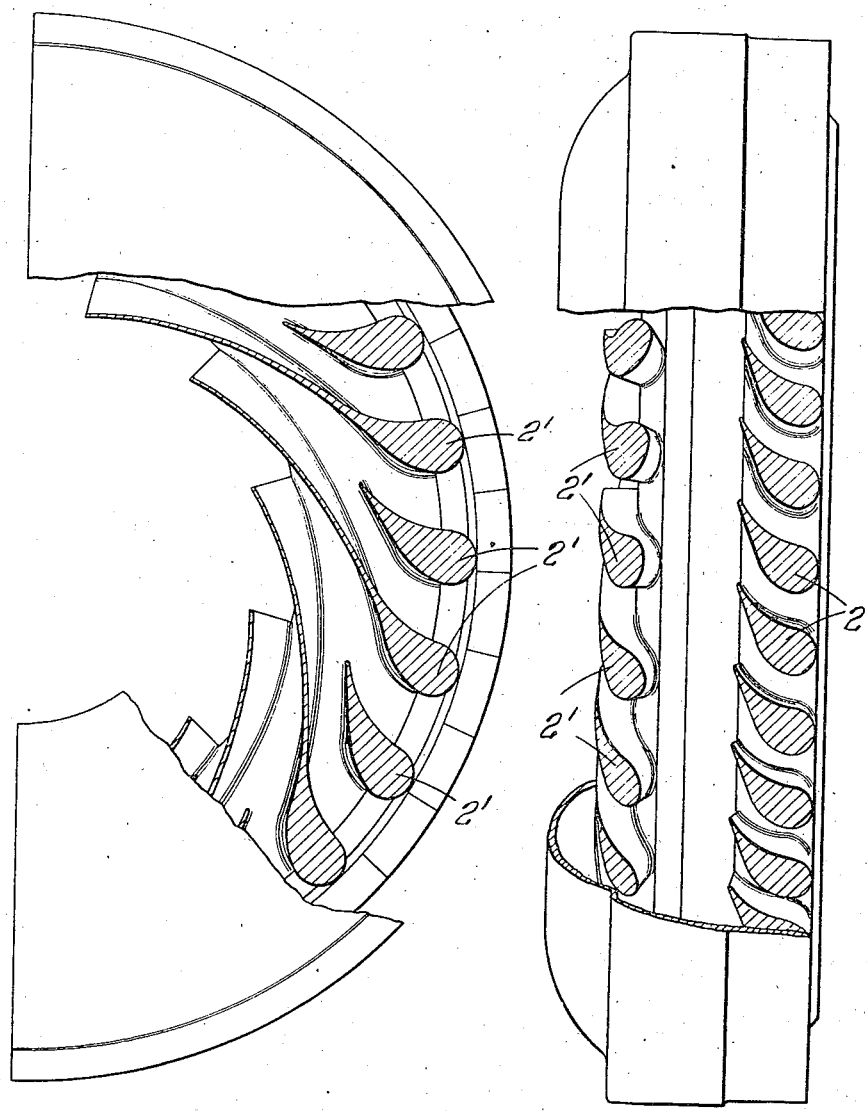

2,293,767

UNITED STATES PATENT OFFICE 2,293,767

HYDRAULIC POWER TRANSMISSION APPARATUS

Piero Mariano Salerni, London, England, assignor to Marie Thérèse Elisabeth Salerni, Virgilia, Eze, Nice, France Application September 27, 1938, Serial No. 231,869
In Great Britain October 13, 1937

5 Claims. (Cl. 60—54)

This invention relates to hydraulic power transmission apparatus of the kind in which a rotary impeller or driving member drives by means of a liquid circulating in a closed or toroidal circuit a turbine or driven member and which comprises a reaction member, and wherein the torque imparted by the hydraulic means to the turbine is or can be substantially greater than that imparted to the impeller whereby transmission of power is effected by the hydraulic means at a torque ratio which varies with the conditions and at times may be substantially greater than the ratio of 1 to 1 independently of any mechanical change speed gearing. This invention is concerned particularly with the reaction member of the combination and its relation to the impeller and turbine.

A reaction member or reactor has a set of reaction vanes so constructed, and arranged at such an angle to the direction of the liquid impinging upon them, that under certain conditions of operation (e. g. when the turbine is stationary, and it is desired to produce an increased torque for the purpose of starting) these vanes impart to the liquid a component of velocity in a forwards direction (i. e. the same direction as the direction of rotation of the impeller). Under such conditions the reaction vanes as a unit are operative and tend to be driven by the liquid in a backwards direction but are restrained against such tendency in order to deflect the liquid in a forwards direction.

As the turbine begins to rotate and the difference between the speeds of the turbine and of the impeller is reduced this tendency of the reactor decreases and ultimately the reaction vane-set may be driven by the liquid in a forwards direction and is then inoperative. When, however, the reaction vanes are driven by the liquid in a forwards direction, their angular disposition tends to cause them to rotate at a slower speed than that of the turbine. If the reaction vanes rotate at a substantially different speed from that of the turbine this adversely affects the efficiency.

In order to provide a large starting torque and also the possibility of obtaining a torque ratio considerably greater than 1 to 1 over a wide range of speeds, it has been found necessary to employ at least two reaction elements or units, each having a set of reaction vanes, one of which units precedes and the other of which follows a set of turbine vanes in the liquid circuit. If both such units or sets of reaction vanes, when they become inoperative, rotate in a forwards direction at a substantially different speed from that of the turbine, the efficiency will be seriously impaired.

In accordance with this invention there is provided hydraulic power transmission apparatus of the kind specified, with at least two reaction elements between which is interposed at least one set of turbine vanes, which reaction elements are capable of rotation relatively to each other and of which at least one under some conditions of operation rotates in a forward direction and is such that the radial distance, from the axis of rotation, of the middle or mean points of the inlets between its vanes is slightly greater than the radial distance from such axis of the middle points of the corresponding outlets.

This said difference of radial distance must be slight, i. e. such that when the reaction vanes are rotating in a forwards direction the difference between the speed at which the liquid drives or tends to drive the said reaction unit or vanes and the speed of the turbine is less than it would be if the radial distances from the axis of rotation of the middle points of the said inlets and outlets were the same. Preferably the said difference of radial distances is such that when the apparatus is transmitting the maximum available power under such conditions that the said reaction unit rotates in a forward direction, it is driven or tends to be driven in that direction by the liquid substantially at the same speed of rotation as the turbine. If the said difference of radial distance is too large, the reaction member will be driven considerably faster than the turbine with consequent loss of efficiency.

Preferably hydraulic power transmission apparatus according to this invention is so constructed that under some conditions of operation both of the reaction units or elements rotate in a forward direction and are as aforesaid.

The invention will now be described by way of example with reference to the accompanying drawings, in which:

Fig. 1 is a section of the apparatus taken through the axis of rotation.

Fig. 2 is an exterior view of the reaction member looking down from the top of Fig. 1, parts being broken away to show the vanes of both reactor units.

Figs. 3, 4 and 5 are, respectively a longitudinal fragmentary section and two cross sections on line A—A in Fig. 3 particularly disclosing a conventional or usual locking arrangement for the reaction member.

Fig. 6 is a fragmentary section showing a pawl type one way brake of the apparatus embodying the invention.

Fig. 7 is a partial side view of the impeller with non-divergent ducts, a portion of the casing being torn away disclosing the interior construction.

Fig. 8 is a partial plan view of the pump impeller with part of the casing broken away.

Fig. 9 is a partial side view of the turbine with part of the casing removed to disclose the vanes of said turbine.

Fig. 10 is a partial plan view with a portion of the casing torn away in order to disclose the vanes upon the turbine.

Referring to Fig. 1, $1^a$ is the outlet of the impeller 1 which is preferably constructed with annular enclosing walls between which are vanes whose delivery ends are turned backwards relatively to the direction of rotation about axis X—X in the manner described and claimed in the specification of Patent No. 2,173,428 granted September 19, 1939 and with non-divergent ducts as set forth in the specification of patent application Serial No. 200,136 filed April 5, 1938. The central parts, adjacent to the rotation axis X—X are shown on Fig. 1, being generally analogous to the central parts shown in applicant's said prior Patent No. 2,173,428 or his British Patent No. 456,277 of 1935, and may be described as follows. At the left is the driving shaft or member X' to which is shown bolted the rotary enclosing member $1^y$, upon which in turn is attached the outer wall $1^x$ of the impeller 1. In axial alinement with the driving member is the driven member or shaft $X^2$, extending through and outwardy toward the right, and to which is keyed the hub $2^y$ of the outer wall $2^x$ of the turbine 2, 2' to be described. At the right also is shown a stationary or anchored sleeve or member $X^3$, necessary for the operation of the reactor, and carrying the ratchet 36 which cooperates with the pawls 34 mounted on the hub $3^y$ of the inner reactor unit 3', as will be described in more detail.

The turbine is interrupted and has two sets of vanes 2 and 2' respectively, spaced apart and the vanes 2' being preferably constructed with their ends near the inlets turned backward and their other parts generally curved in the opposite direction in the manner described and claimed in the specification of patent application Serial No. 221,812 filed July 28, 1938.

With this invention there are at least two, two being shown, reactors or reaction vane sets, the first or inner reactor 3' with vanes $3^b$ being interposed between the outlet of the turbine and the impeller inlet and the second reactor unit $3^a$ being outwards of the first unit in the interruption space of the turbine.

The liquid from the impeller on driving shaft X' enters between the first set of turbine vanes 2 by the inlets $2^a$ and leaves by the outlet $2^b$, the turbine vanes being so disposed that, as the liquid flows through, the turbine, with driven shaft $X^2$, tends to rotate forwardly while the direction of flow of the liquid is turned backwardly. The liquid then enters the ducts between the reaction vanes $3^a$ by the inlets 4, the reaction vanes (as shown at $3^a$, $3^a$, Fig. 2) being so disposed as to change the direction of flow of the liquid again to a forwards direction. The forward direction of rotation of the impeller is shown by the arrow on the reactor 3, Fig. 2. The reaction elements when operative are prevented from rotation in a backwards direction while remaining free to rotate in a forward direction relative to the fixed casing by any suitable means, such as for example shown in Figs. 1, 3, 4, and 5, associated with the fixed sleeve $X^3$. The liquid leaves the reaction vanes $3^a$ by the outlets 5 and enters between the turbine vanes 2' by the inlets $2^c$, and it leaves the turbine by the outlets $2^d$ and enters the ducts between the reaction vanes $3^b$ (also shown at $3^b$, $3^b$, Fig. 2) by the inlets 6 thereof and leaves this reactor unit by the outlets 7, whence it passes across into the inlets 8 of the impeller 1.

The turbine vanes 2' and the following reaction vanes $3^b$ cooperate in a manner similar to that of the turbine vanes 2 and reaction vanes $3^a$.

In the embodiment of the invention illustrated, the radical distance of the middle or mean points of the inlets 4 and 6 from the rotation axis X—X is slightly greater than that of the middle points of the corresponding outlets 5 and 7 respectively, as plainly appears in Fig. 1.

The difference in the radial distances from the rotation axis of the middle points of the inlets 4 and 6 and the corresponding outlets 5 and 7 respectively, preferably is such that, when the apparatus is transmitting maximum available power, at a torque ratio 1 to 1, the reaction vanes are driven or tend to be driven by the liquid in a forwards direction substantially at the same speed of rotation as the turbine. This can readily be determined by trial, and the radius differential may in the illustrated apparatus be substantially as shown.

This feature may be elucidated as follows, its utility pertaining particularly to conditions when driving under high power and at full speed or unit ratio, or substantially so. With an ordinary reactor, for example as shown in applicant's prior Patents Nos. 2,122,353 of June 28, 1938, and 2,173,428 of September 19, 1939, while the liquid issuing from the turbine, at high speed unit ratio, delivers a forward drive to the reactor, still the reactor turns at a considerably lower speed than the turbine. Due to the curvature of the reactor vanes, away from radial planes, the reactor has a strong tendency to lag, in the toroidal flow, and this reduced reactor speed is found to interfere with the cooperation and flow between turbine and impeller, with loss of efficiency. The described novel feature in the present invention tends to offset the reduced-speed tendency of the reactor by causing a forward-drive tendency, due to the arrangement of the reactor duct entrances at a slightly greater radius than their outlets, or the middle or mean points thereof. Thus by the structure shown in Fig. 1 there is afforded a reactor rotary speed substantially the same as that of the impeller and turbine, so that at unit ratio all three turn in substantial unison, substantially the equivalent of a positive drive connection between engine and vehicle wheels, the full speed rotation of the reactor avoiding any interference with the flow of the liquid across from the turbine to the impeller. Under these conditions the reactor performs in effect like an inefficient turbine, developing enough power to insure its own rotation at a speed substantially equalling that of the impeller and turbine. The liquid has to pass with centripetal trend through the reactor ducts, so that centrifugal force resists the flow and causes lateral reactions against the vanes, producing the forward drive tendency that may neutralize the lag tendency, and give a speed substantially equal to the turbine speed, as the reactor, under these unit-ratio conditions, swims idly through the toroidal flow.

In the embodiment illustrated, the outer reaction element 3 is rotatably mounted in such a manner that it can rotate in a forwards direction independently of the inner reaction element 3' but is prevented by the ratchet and pawl device 13ª—3ˣ from relative rotation in a backwards direction. The reaction element 3' is prevented from rotation in a backwards direction while remaining free to rotate in a forward direction relative to the fixed casing by any suitable means, associated for example with the anchored sleeve X³.

Figs. 3, 4 and 5, as already mentioned, are respectively, a longitudinal section and two cross-sectional views taken on the line A—A of Fig. 3 indicating one conventional or usual locking or ratchet arrangement for the reaction member. The reaction unit 3' has a drum extension 32 which carries within it a pawl housing 33 with pawls 34 which pivot on pins 35 and can engage with the teeth on a stationary ratchet member 36 under the influence of the spring plungers 37. The ratchet is formed on the fixed sleeve X³ concentrically surrounding the interior shaft X² shown, the sleeve at its right hand end having an outward flange by which it is anchored. The pawl housing 33 is mounted in the drum 32 on helical splines 39 and is normally kept against an end plate 38 of the drum by spring plungers 40, so that when the pawls 34 become engaged with the ratchet teeth on the member 36, as in Fig. 4, the housing 33 is turned helically relatively in the drum 32, sliding along from right to left against the action of the spring plungers 40, the shock of engagement being absorbed by the dashpot action afforded by the projecting sleeve 41 on the housing 33. Fig. 4 shows the pawls engaged when the reaction member tends to rotate backwards and Fig. 5 shows the pawls disengaged when the reaction member 3' rotates forwards, centrifugal force then holding the pawls out of engagement with the ratchet teeth, preventing wear.

In Fig. 6, the two reaction members 3 and 3' are shown, the former carrying a spring loaded pawl 13ª pivoted at 13 for engaging one way ratchet teeth 3ˣ formed on the reaction member 3'. This one-way device 3ˣ—13ª is indicated also in Fig. 1.

In Figs. 7 and 8 the impeller 1 is shown with the vanes between the enclosing walls 1ˣ—1ˣ forming the non-divergent ducts or passages, and showing those portions of the vanes at the outlets which are curved backwardly relatively to the direction of rotation.

In Figs. 9 and 10 the turbine vanes 2' are shown so arranged that at their inlet ends, they have a backwards curvature, while at their remaining parts extending towards the axis of the apparatus, the vanes are curved in the opposite direction. Therefore the ducts between these vanes are curved backwards at or near the inlets in the direction relatively to the direction of rotation, and thereafter have a general curvature opposite to the backwards curve, resembling a long-S or ogee curve.

The vanes of each unit of the reaction member may be and preferably are formed with bulbous heads or receiving ends as indicated for example in Fig. 2 of the accompanying drawings. More particularly the reaction vanes may be constructed with bulbous or rounded heads of the proportion shown in the drawings and claimed in the specification of Patent No. 2,122,353.

The arrangement of the units and vanes of the reaction member, their relation to the impeller and turbine members, and the relative sizes and dispositions of the various parts as shown in the drawings have been found in practice to be satisfactory in the application of the invention to an automobile, but may be variously modified within the principles of the invention, as well as adapted to other practical uses.

What I claim and desire to secure by Letters Patent of the United States is:

1. Hydraulic transmission apparatus of the kind described, which constitutes per se a drive apparatus adapted to afford torque increase under high load conditions at starting or intermediate speed ratios, the same comprising a turbine and an impeller, and including at least two reaction elements with one-way clutch means between two of them, one of which two elements by reason of said clutch means is capable of rotation in a forward direction relatively to the other thereof, and between which said two reaction elements at least one set of turbine vanes is interposed, and of which said two reaction elements at least one element is so arranged and disposed with respect to the axis of rotation, that the average radial distance of the middle points of the inlets between the vanes of said one element to the rotation axis is slightly greater than the average radial distance from said axis to the middle points of the corresponding outlets between the vanes.

2. Hydraulic power transmission apparatus of the kind specified, which constitutes per se a drive apparatus adapted to afford torque increase under high load conditions at starting or intermediate speed ratios, the same comprising vaned impeller, turbine and reactor members, the said reactor having two separated reaction units between which is interposed a set of vanes of said turbine, which reaction units have bulbous headed vanes and are both capable of forward rotation and of rotation relatively to each other, such apparatus being provided with a one-way brake device for the first reaction unit preventing its backward rotation, and a one-way clutch device for the second unit preventing its rotation backwardly but permitting its rotation forwardly relatively to the first unit, whereby under certain running conditions the reaction units are rotated by the liquid in a forward direction, the vanes of each unit being so disposed that the radial distances from the axis of rotation to the middle points of the inlets between the vanes thereof are slightly greater than the radial distances to the middle points of the outlets thereof.

3. A hydraulic variable-speed power transmitter of the kind, which constitutes per se a drive apparatus adapted to afford torque increase under high load conditions at starting or intermediate speed ratios, the same having a driving impeller and a driven turbine each comprising enclosing annular walls with interior duct-forming vanes and the two rotatable in a vis-a-vis relation about a common rotation axis, with a liquid mass confined to flow around a toroidal circuit first outwardly with respect to the rotation axis through the impeller ducts, extending substantially the full radial extent of the circuit, and thence by discharge therefrom with axial component to enter the turbine ducts and flow inwardly therein for recirculation; characterized in that in the part of the hydraulic circuit not occupied by the impeller there are two reactor units or vane-sets, the first such unit being interposed between the turbine outlet and the impeller inlet and the second such unit being located outwards of the first unit in an interruption space between two successive portions of the turbine, said reactor units being each provided with a one-way device adapting it for forward but against backward rotation and one of said devices comprising a one-way clutch device adapting one of said units for rotation forwardly relatively to the other, and at least one of said reactor units having the mean points of its duct inlets located at a slightly greater radius from the rotation axis than the mean points of its duct outlets, thereby to determine its forward rotation speed under unitary drive ratio.

4. A hydraulic variable-speed power transmitter of the kind, which constitutes per se a drive apparatus adapted to afford torque increase under high load conditions at starting or intermediate speed ratios, the same having a driving impeller and a driven turbine each comprising enclosing annular walls with interior duct-forming vanes and the two rotatable in a vis-a-vis relation about a common rotation axis, with a liquid mass confined to flow around a toroidal circuit first outwardly with respect to the rotation axis through the impeller ducts, extending substantially the full radial extent of the circuit, and thence by discharge therefrom with axial component to enter the turbine ducts and flow inwardly therein for recirculation; characterized in that in the part of the hydraulic circuit not occupied by the impeller there are at least two reactor units or vane-sets, the first such unit being interposed between the turbine outlet and the impeller inlet and the second such unit being located outwards of the first unit in an interruption space between two successive portions of the turbine, said reactor units being mounted for forward but against backward rotation and at least one of said units being rotatable forwardly relatively to the other, and at least one of said reactor units having the mean points of its duct inlets located at a slightly greater radius from the rotation axis than the mean points of its duct outlets, thereby to determine its forward rotation speed under unitary drive ratio; and characterized further in that the mountings of the reactor units include a one-way device preventing any backward rotation of the first or inner unit, and a second one-way device interposed between the units preventing any relative backward rotation of the second or outer unit.

5. A hydraulic variable-speed power transmitter of the kind, which constitutes per se a drive apparatus adapted to afford torque increase under high load conditions at starting or intermediate speed ratios, the same having a driving impeller and a driven turbine each comprising enclosing annular walls with interior duct-forming vanes and the two rotatable in a vis-a-vis relation about a common rotation axis, the turbine being divided into separated short and long portions, with a liquid mass confined to flow around a toroidal circuit first outwardly with respect to the rotation axis through the impeller ducts, and thence by discharge therefrom with axial component to enter the turbine ducts and flow inwardly therein for recirculation; characterized in that in the hydraulic circuit there are two reactor units or vane-sets, the inner unit being near the innermost part of the circuit and interposed between the turbine outlet and impeller inlet, and the outer unit located near the outermost part of the circuit in an interruption space between the successive short and long portions of the turbine, said inner reactor unit being provided with a one-way brake device adapting it for forward but against backward rotation, and said outer unit being provided with a one-way clutch device between it and the inner unit rendering it rotatable forwardly but not backwardly relatively to the inner unit.

PIERO MARIANO SALERNI.